July 19, 1949.  F. FAHLAND  2,476,362
CROSSBAR SUPPORT FOR VEHICLES
Filed April 23, 1945  2 Sheets-Sheet 1
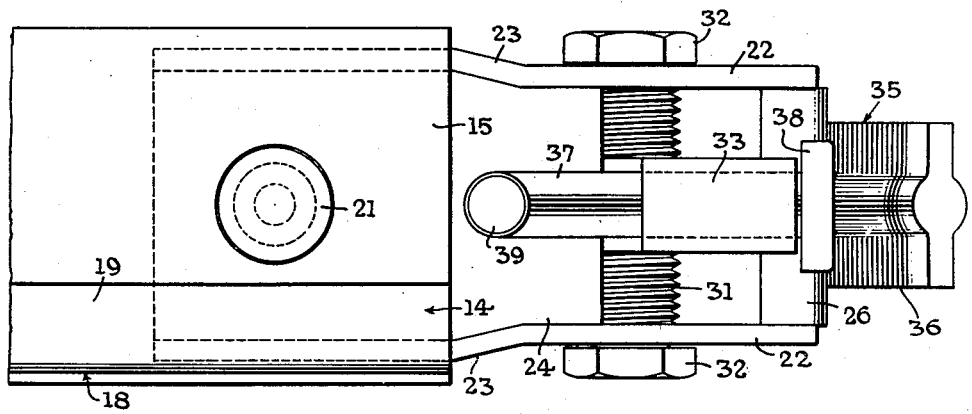
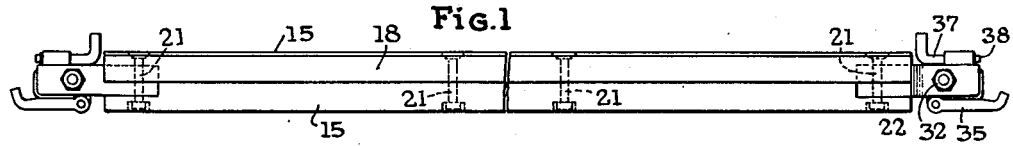
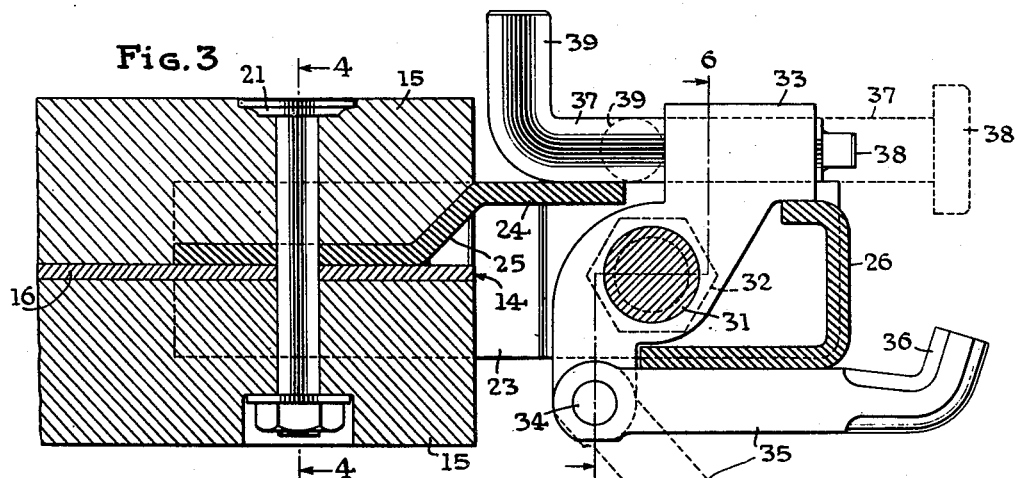
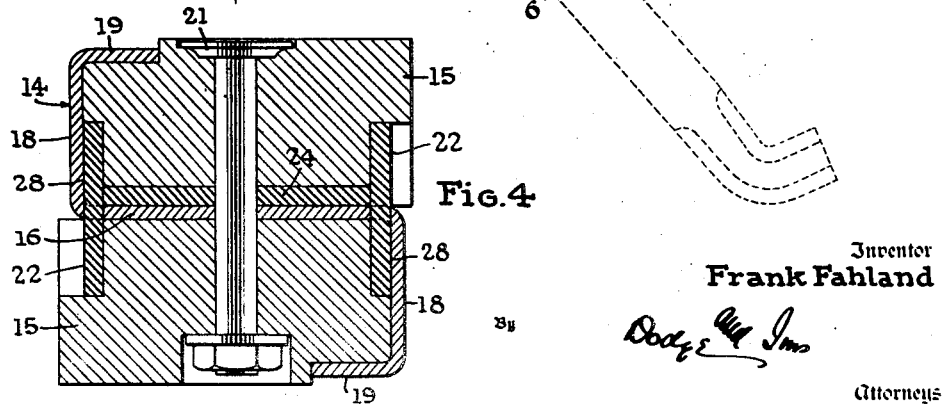
Inventor
Frank Fahland
Attorneys July 19, 1949.　　　　F. FAHLAND　　　　2,476,362
CROSSBAR SUPPORT FOR VEHICLES
Filed April 23, 1945　　　　　　　　　　2 Sheets-Sheet 2
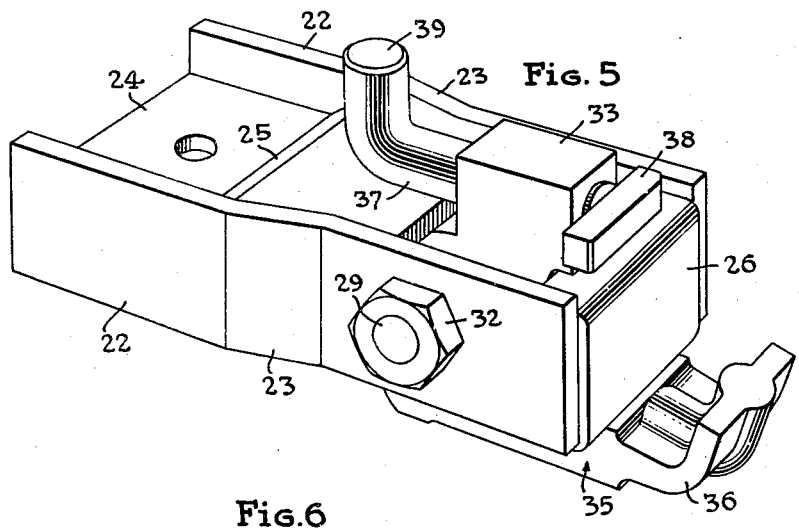
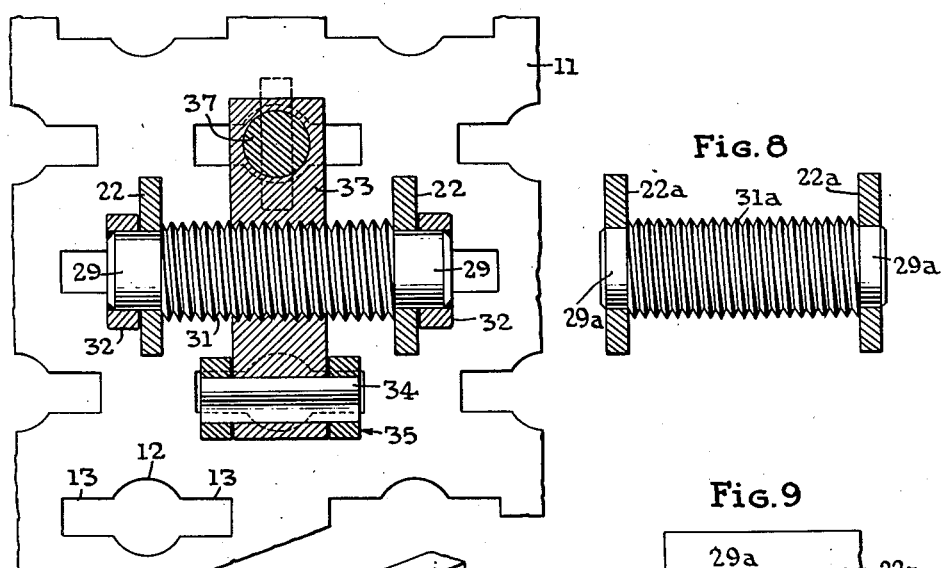
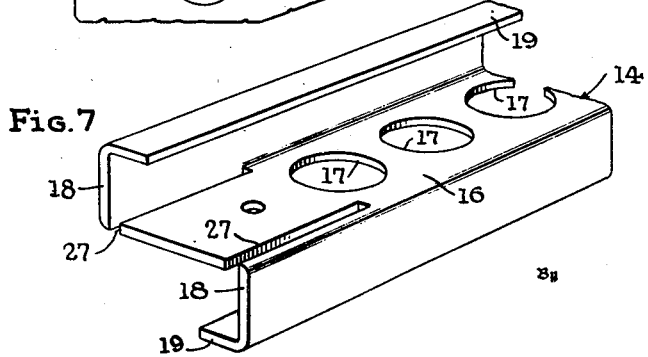
Inventor
Frank Fahland
Attorneys Patented July 19, 1949

2,476,362

UNITED STATES PATENT OFFICE 2,476,362

CROSSBAR SUPPORT FOR VEHICLES

Frank Fahland, Omaha, Nebr.

Application April 23, 1945, Serial No. 589,729

8 Claims. (Cl. 105—369)

1

This invention relates to load-supporting and load-bracing elements for use in transport vehicles, such as ships, freight cars, trucks and the like. As a convenient way of explaining the invention it will be described as embodied for use in freight cars of the box car type.

It is known practice to provide a box car with a steel lining which is spaced from the car wall and is provided with spaced perforations which receive locking fixtures mounted on the ends of crossbars used to support or confine crated or other articles shipped in the car.

The invention relates to such crossbars, and the novelty resides in features that improve the beam strength of such bars, insure reliable attachment of both ends of a bar to the perforated lining, and permit either or both ends of the bar to be adjusted in transverse directions. Such adjustment is usually needed in a horizontal direction, and the illustrated embodiments afford such adjustment by way of example. The adjusting means is such as to permit the development of considerable force so that loads may be tightly clamped.

Secondary features relate to means adopted to reduce weight and present wooden contact surfaces to the lading. The design is such that the locking and adjusting means lie wholly within the dimensional limits of an end projection of the beam, thus avoiding interference with and damage to lading, and permitting two similar beams to be mounted side by side and in contact when a second is needed to reinforce the first.

Some cars have apertured posts (either fixed or adjustable) in lieu of the perforated lining above mentioned. The invention can readily be adapted to connections of beams or the like to such posts, the problem being basically the same. Indeed the invention can be used wherever it is desired releasably to connect the ends of a beam to apertured parallel supports in selected positions. As a rule such beams are horizontal, and the desired directions of adjustment of the ends after attachment are likewise horizontal, but the invention is obviously not limited in either respect.

The composite structure of the beam is not claimed in the present application but forms the subject matter of a divisional application Serial No. 94,160, filed May 19, 1949.

Preferred embodiments will now be described by reference to the accompanying drawings, in which:

Fig. 1 is a side elevation of a complete beam with the middle portion broken out to reduce the length of the view.

Fig. 2 is a plan view of an end fitting attached to the beam.

Fig. 3 is a longitudinal medial section through the parts shown in Fig. 2.

Fig. 4 is a section on the line 4—4 of Fig. 3.

Fig. 5 is a perspective view of an end fitting before attachment to the beam.

Fig. 6 is a section transverse to the beam when attached to the perforated wall. The plane of section is indicated by the line 6—6 in Fig. 3.

Fig. 7 is a perspective view of the steel component of the beam.

Fig. 8 is a fragmentary view similar to a portion of Fig. 6, showing a modified adjusting screw.

Fig. 9 is a fragmentary elevation showing the wrench socket in the ends of the modified screw of Fig. 8.

Perforated walls for freight cars are standardized to some extent, and a typical perforated lining plate is indicated at 11 in Fig. 6. The perforations, which are alined in horizontal and vertical rows, comprise a circular center 12 with diametrically opposite horizontal rectangular extensions 13.

The beam proper is composite and comprises a pressed steel shell 14 S-shaped in cross-section and two wooden inserts 15. The central web 16 of the shell 14 is at the neutral axis of the beam and hence can be lightened by a row of perforations 17 without loss of strength. Projecting oppositely from opposite edges of web 16 are rimmed flanges 18. The rims 19 of flanges 18 are sunk in rebates cut in the inserts 15, so that the wooden inserts form the load-contacting surfaces of the beam. Through bolts 21 (see Figs. 3 and 4) whose ends are countersunk clamp the inserts 15 to the shell 14, i. e. against the web 16.

The end housings are conveniently constructed of plate by welding pressed or forged sections. The components welded together are two side plates 22 offset toward each other at 23, an interposed connecting web 24 with offset 25 and a J-shaped tie member 26 which connects the extreme ends of the side plates 22 (see Figs. 2, 3 and 5).

The end housings are welded to shell 14. The side plates enter slots 27 in web 16 and engage the inner faces of flanges 18, to which they are welded at 28 (see Figs. 4 and 7). The web 24 engages web 16 and is welded thereto. Thus the end housings are virtually integral with the shell 14 of the beam. The wood inserts 15 are clamped to the shell and stiffen the same but offer comparatively little direct support to the end housings (see Fig. 3).

The vertical dimension of side plates 22 is materially less than the depth of the beam (see Fig. 3) and the horizontal dimension between the outer faces of plates 22 is considerably less than the width of the beam (see Fig. 2).

The plates 22, between members 24 and 26 have alined apertures in which journals 29 at the ends of a heavy screw 31 are rotatable. Hexagonal nuts 32 are welded to the projecting ends of journals 29 and form means for turning the screw 31. The screw is thus swiveled in the end housing.

Threaded on screw 31 is a block or carriage 33 whose form is clearly shown in Figs. 2, 3 and 6. The carriage is held against rotation by engagement with portions of cross-member 26.

Hinged to block 33 on horizontal pin 34 is a locking arm 35. This has a hooked end 36 of a cross-section (see Fig. 5) such as to fit any of the holes 12, 13 on plate 11. Slidable longitudinally in a guide formed in the upper part of block 33 is a bolt 37 with a crossbar 38 in its end, so dimensioned that the end of the bolt will pass through a second hole in plate 11 and when turned will engage behind that plate. A lateral handle 39 serves to turn and thus lock the bolt.

There are identical fittings at the two ends of the beam. See Fig. 1.

It will be observed that the nuts 32, bolt 37 (when locked) and arm 35 (when engaged) are all between the planes defined by the two side surfaces and the top and bottom surfaces of the beam. The possible travel of block 33 is more than half the interval center to center between holes 12.

If desired, the nuts 32 can be eliminated as shown in Figs. 8 and 9. In this view parts similar to those in Figs. 1–7 have the same reference numerals with the letter a. The ends of the journals 29a are substantially flush with the outer faces of plates 22a and have hexagonal sockets 41 by which the screw may be turned.

*Operation*

In placing the beam it is held with its ends slightly above the desired position and the arms 35 are swung up so that the ends 36 start into appropriate holes 12, 13. The beam is then lowered until arms 35 engage cross-member 26, whereupon the bolts 37 are protruded and turned 90°. They enter the holes next above those entered by the arms 35. The screws 31 may then be turned to advance the beam into engagement with the lading.

The beam locks at its end to the plates so as to be held against relative motion in any direction. The beam may thus be placed above an object and act to hold it down. The screws afford progressive horizontal adjustment of such extent relatively to the spacing of the supporting perforations that precise setting of the beam may always be had. If needed, a second beam may be set behind and forced against the first to reinforce it.

The construction of the composite beam is an important feature. The S-shaped shell 14 is of pressed steel and of such form that the metal is effective to the fullest extent, providing a beam with the maximum practicable section modulus in both transverse directions.

With the beam postioned as described the flanges 18 give strength to resist buffing stresses or other forces acting in a horizontal direction. Similarly the rims 19 give strength to resist vertical loads. The perforations 17 in the web 16 reduce weight without impairing strength because they are substantially at the neutral axis for either direction of loading.

The wooden inserts bearing against flanges 18 and under rims 19 and being bolted together through the web 16 at intervals throughout the length of the beam, as indicated at 21 in Figs. 1 and 4, are effective as load-bearing components of the composite beam. Not only do they resist bending moments imposed on the composite beam, but also they resist compressional and torsional stresses and resulting deformation such as might otherwise result in the thin steel section of the S-shaped shell 14.

In addition to the above structural aspects the wooden inserts are the load-contacting portions of the beam.

Since the end housings are welded to the core, a durable and very rigid structure results.

The member 35, when engaged in the perforated plate on the side wall of the car, or when engaged in a similar recess in a column, will resist loads in any direction transverse to the beam, except upward. It will act in tension in the event that the end of the beam tends to separate from the wall or column. The bolt 37 is loaded in shear, by stresses transverse to the beam in any direction. This bolt holds the end of the beam against upward motion and supplements the related member 35.

Moreover, when the head 38 on the end of the bolt 37 is engaged behind the perforated plate the handle 39 is at its limit of motion or nearly so. Hence, the bolt 37 may react in tension under certain circumstances. The fact that all components of the end fittings lie within the projected area of the end of the beam makes it possible to assemble two beams side by side and in contact with one another.

The concept may be variously embodied and may be used for many purposes. The embodiment above described in detail is intended to be exemplary. The scope of the invention will be defined solely by the claims.

What is claimed is:

1. A locking unit for connecting a beam releasably with an apertured support, comprising a hooked member hinged to the beam on a transverse axis, so as to swing into sustaining engagement with the beam as its hooked end enters an aperture in the support; and a bolt movable in a path approximately parallel with the hooked member when the latter is in such sustaining engagement, said bolt being adapted to enter, when projected, another aperture in the support and thereby inhibit disengaging motion of the beam and hooked member.

2. In a load-sustaining device for engagement with a support having a series of apertures, the combination of a beam; a housing mounted at the end of the beam to form a continuation thereof; a traversing block guided in said housing to move in a direction transverse to the beam; force multiplying means within said housing for producing such motion; a hooked member hinged to said traversing block on a transverse axis so as to swing into sustaining engagement with the housing as its hooked end enters an aperture in the apertured support; and a bolt movable on the traversing block in a path approximately parallel with the hooked member when the latter is in such engagement, said bolt being adapted to enter another aperture in said support, when projected.

3. In a load-sustaining device for use with a support having a series of apertures, the combination of a beam; a housing mounted at the end of the beam to form a continuation thereof and having transverse dimensions less than the transverse dimensions of the beam; a traversing block guided in said housing to move in a direction transverse to the beam; force multiplying means within said housing for producing such motion; a hooked member hinged to said traversing block on a transverse axis so as to swing into sustaining engagement with the housing as its hooked end enters an aperture in the apertured support; and a bolt movable on the traversing block in a path approximately parallel with the hooked member when the latter is in such engagement, said bolt being adapted to enter another aperture in said support, when projected.

4. A load-bearing member for temporary attachment to parallel supports having a series of spaced locking apertures, comprising in combination, a beam; housings mounted, one at each end of the beam, each housing having a guideway, said guideways being parallel with each other and transverse to the beam; carriage members one guided in each of said guideways; force multiplying means reacting between each housing and the carriage member which it guides and operable to shift the carriage relatively to the housing; and two locking members mounted on each carriage member and operable to engage in different apertures in the corresponding one of said supports, both said locking means, when engaged in said apertures, serving to resist thrust developed by operation of said force multiplying means.

5. The combination defined in claim 4, in which the two locking members mounted on each carriage comprise a locking lug hinged to the side of the carriage member on an axis transverse to the beam and so dimensioned that when it is swung against the side of the carriage member it projects beyond the end of the beam in position to enter an aperture in a support and a bolt-like member projectable in the direction of its length and of the length of the beam to enter another aperture in the same support.

6. A load-bearing member for temporary attachment to parallel supports having series of spaced locking apertures, comprising in combination, a beam; and pairs of locking means, one pair at each of the opposite ends of said beam, each pair comprising a locking lug hinged to the side of the beam on an axis transverse to the beam and so dimensioned that when it is swung against the side of the beam it projects beyond the end of the beam in position to enter an aperture in a support, and a bolt-like member projectable in the direction of its length and of the length of the beam, to enter another aperture in the same support.

7. A load-bearing member for temporary attachment to parallel supports having a series of spaced locking apertures, comprising in combination, a beam; carriers mounted to move transversely of the beam and located one adjacent each end of the beam; force multiplying means associated with each carrier to produce relative transverse motion between the carrier and beam; hooked sustaining members, one hinged on each of said carriers on an axis transverse to the beam, so as to be capable of engaging in selected apertures; and bolts one guided on each carrier to be projectable in the direction of the length of the beam through other apertures.

8. A load-bearing member for temporary attachment to parallel supports having a series of spaced locking apertures, comprising in combination, a beam; carriers mounted to move transversely of the beam and located one adjacent each end of the beam; force multiplying means associated with each carrier to produce relative transverse motion between the carrier and beam; hooked sustaining members, one hinged on each of said cariers on an axis transverse to the beam, so as to be capable of engaging in selected apertures; bolts one guided on each carrier to be projectable in the direction of the length of the beam through other apertures, said bolts being each capable of rotation about its longitudinal axis and each having a locking head which when the bolt is turned engages the support to inhibit retraction of the bolt.

FRANK FAHLAND.

REFERENCES CITED

The following references are of record in the file of this patent:

UNITED STATES PATENTS

| Number | Name | Date |
| --- | --- | --- |
| 1,909,243 | Adamy | May 16, 1933 |
| 2,030,773 | Thomas | Feb. 11, 1936 |
| 2,085,923 | Murphy | July 6, 1937 |
| 2,268,394 | Herbert | Dec. 30, 1941 |
| 2,294,795 | Moses | Sept. 1, 1942 |
| 2,309,606 | Nystrom | Jan. 16, 1943 |
| 2,354,861 | Hermann | Aug. 1, 1944 |